United States Patent
Liesener et al.

(10) Patent No.: US 9,115,975 B2
(45) Date of Patent: Aug. 25, 2015

(54) POSITION MONITORING SYSTEM WITH REDUCED NOISE

(71) Applicant: Zygo Corporation, Middlefield, CT (US)

(72) Inventors: Jan Liesener, Middletown, CT (US); Robert M. Carangelo, Glastonbury, CT (US); Leslie L. Deck, Middletown, CT (US); Michael Lowell Holmes, Lebanon, CT (US); Alexander D. Wesley, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 49 days.

(21) Appl. No.: 14/045,134

(22) Filed: Oct. 3, 2013

(65) Prior Publication Data

US 2014/0098375 A1 Apr. 10, 2014

Related U.S. Application Data

(60) Provisional application No. 61/709,923, filed on Oct. 4, 2012.

(51) Int. Cl.
*G01B 9/02* (2006.01)

(52) U.S. Cl.
CPC ............ *G01B 9/0209* (2013.01); *G01B 9/0207* (2013.01); *G01B 9/02044* (2013.01); *G01B 9/02062* (2013.01); *G01B 9/02072* (2013.01); *G01B 9/02074* (2013.01)

(58) Field of Classification Search
CPC ........... G01B 9/02044; G01B 9/02055; G01B 9/02062; G01B 9/0207; G01B 9/02071; G01B 9/02072; G01B 9/02074; G01B 9/0209
See application file for complete search history.

(56) References Cited

U.S. PATENT DOCUMENTS

| 5,805,282 A | 9/1998 | Prior et al. |
| 7,636,166 B2 | 12/2009 | De Groot et al. |
| 7,639,367 B2 | 12/2009 | Groot et al. |

(Continued)

FOREIGN PATENT DOCUMENTS

CN 102057269 5/2011 ............. G01N 21/45

OTHER PUBLICATIONS

Chris P. Brophy, "Effect of intensity error correlation on the computed phase of phase-shifting interferometry", *J. Opt. Soc. Am. A*, vol. 7, No. 4, pp. 537-541 (Apr. 1990).

(Continued)

*Primary Examiner* — Michael A Lyons
(74) *Attorney, Agent, or Firm* — Fish & Richardson P.C.

(57) ABSTRACT

An interferometry system for monitoring changes in the position of an object, the system includes a spectrally broadband light source, a sensor module having an interferometer that direct portions of the light received from the source along separate paths. The system includes an intensity monitor having a detector configured to measure the intensity of additional light derived from the source and to produce a monitor output signal. The system includes an electronic processing module to process a sensor output signal based on the monitor output signal to account for intensity fluctuations in light output by the source, and determine information about the changes in the position of the object. The intensity monitor is configured to characterize the intensity fluctuations as a function of wavelength or intensity fluctuations that are spectrally correlated.

22 Claims, 10 Drawing Sheets

(56) References Cited

U.S. PATENT DOCUMENTS

| | | | |
|---|---|---|---|
| 7,826,064 | B2 | 11/2010 | de Groot et al. |
| 8,120,781 | B2 | 2/2012 | Liesener et al. |
| 8,564,787 | B2 * | 10/2013 | Yamakita ............... 356/479 |
| 2003/0035120 | A1 * | 2/2003 | Myatt et al. ............ 356/519 |
| 2005/0078316 | A1 | 4/2005 | Ronnekleiv et al. |
| 2009/0128827 | A1 | 5/2009 | De Groot et al. |
| 2010/0128278 | A1 | 5/2010 | Deck et al. |
| 2011/0216326 | A1 * | 9/2011 | Sasaki et al. ........... 356/498 |
| 2011/0235050 | A1 | 9/2011 | Bajraszewski et al. |

OTHER PUBLICATIONS

T. Y. Liu et al., "Partially multiplexing sensor network exploiting low coherence interferometry", *Applied Optics*, vol. 32, No. 7, pp. 1100-1103 (Mar. 1, 1993).

Malacara, "Phase Shifting Interferometry", *Interferogram Analysis for Optical Testing*, pp. 246-283 (NY Marcel Dekker) (1998).

*Microlithography: Science and Technology*, edited by J. R. Sheats and B. W. Smith, Marcel Decker, Inc., pp. 1-107 (New York, NY 1998).

W. Sibbett et al., "The development and application of femtosecond laser systems", *Optics Express*, vol. 20, No. 7, pp. 6989-7001 (Mar. 26, 2012).

Peter W. Smith, "Mode-Locking of Lasers", *Proceedings of the IEEE*, vol. 58, No. 9, pp. 1342-1357 (Sep. 1970).

Taiwan Office Action and Search Report for Taiwan Patent Application No. 102135792 Dated Oct. 27, 2014 (10 pages).

International Preliminary Report on Patentability for International Application No. PCT/US2013/063243 dated Apr. 7, 2015 (7 pages).

International Search Report and the Written Opinion of the International Searching Authority for International Application No. PCT/US2013/063243 dated Jan. 6, 2014 (10 pages).

* cited by examiner

POSITION MONITORING SYSTEM WITH REDUCED NOISE

CLAIM OF PRIORITY

This application claims the benefit of the priority date of U.S. Provisional Patent Application No. 61/709,923, entitled "POSITION MONITORING SYSTEM WITH REDUCED NOISE," filed on Oct. 4, 2012, pursuant to 35 USC §119. The entire content of this provisional application is herein incorporated by reference.

BACKGROUND

For many precision engineering systems, it is required to measure the position of an object to nm-level tolerances over long periods of time, e.g., days, months, or even years. The range of motion of the object may be small, e.g., less than a mm in any direction, but should be controlled with an active servo loop for stability and to provide for fine, controlled adjustments.

An example of such a precision engineering system is the exposure system of a modern photolithography tool. Examples of exposure systems are described in *Microlithography: Science and Technology*, edited by J. R. Sheats and B. W. Smith, Marcel Decker, Inc. (New York, N.Y. 1998). Exposure systems include illumination assemblies to illuminate a reticle or mask and projection objective assemblies to image the reticle pattern onto a wafer.

In such exposure systems, various components such as a wafer stage, a reticle stage, and optical components such as lenses and/or mirrors and/or subassemblies thereof, are held in relationship to each other and/or in relation to a frame. Moreover, certain components are configured to move relative one another or the frame and such movement needs to be monitored by high-accuracy sensors, such as displacement measuring interferometers.

SUMMARY

Disclosed herein are broadband, displacement-measuring interferometry systems that are configured to compensate for spectrally dependent intensity fluctuations in the light output from a broadband light source. The applicants have discovered that such spectrally dependent intensity fluctuations can, if not accounted for, limit the accuracy attainable with displacement measuring interferometry systems, including the accuracy desirable in next generation sensors for microlithography exposure systems (e.g., ~50 pm).

In general, in one aspect, disclosed herein is an interferometry system for monitoring changes in position of an object. The system includes:

i) a spectrally broadband light source;
ii) at least one sensor module, each sensor module comprising an interferometer configured to receive light derived from the source, direct portions of the light along separate paths, and subsequently recombine the portions of light, wherein at least one of the paths contacts the object and wherein each sensor module further comprises a detector configured to measure the recombined light portions and produce a sensor output signal
iii) at least one intensity monitor, each intensity monitor comprising a detector configured to measure the intensity of additional light derived from the source and produce a monitor output signal; and
iv) an electronic processing module configured to receive the sensor output signal and the monitor output signal, process the sensor output signal based on the monitor output signal to account for intensity fluctuations in light output by the source, and determine information about the changes in the position of the object.

For example, the spectrally broadband source can provide light spanning a bandwidth greater than 0.1 nm, and the object can be a component of a microlithograpy exposure system, such as a wafer stage or a reticle stage or a mount for an optical component in the microlithography exposure system.

Embodiments of the system can include any of the following features.

In certain embodiments, the intensity monitor can be configured to measure the intensity at multiple different spectral channels to characterize the intensity fluctuations as a function of wavelength. For example, the intensity monitor configured to measure the intensity at multiple different spectral channels can include a prism, a wavelength filter, a diffraction grating, a scanning Fabry-Perot etalon, a fixed etalon, or an additional interferometer.

In certain embodiments, the intensity fluctuations in the spectrally broadband source are spectrally correlated. For example, the broadband source can include a broadband coherent light source, a rapidly tuned laser over a broad spectral bandwidth, or an array of phase-locked lasers. In such embodiments, the electronic processing module can be configured to process the sensor output signal based on the monitor output signal and information about the spectral correlation to account for wavelength-dependent intensity fluctuations in the light output when determining the information about changes in the position of the object.

In certain embodiments, the at least one intensity monitor comprises an interferometric cavity having a fixed optical path length difference. In addition, an optical path length difference defined by the separate paths in the interferometer in the sensor module is configured to span a range that includes the fixed optical path length difference of the interferometric cavity in the intensity monitor. The output monitor signal can include two or more simultaneous intensity measurements for the fixed optical path length difference at different phase offsets. For example, the at least one intensity monitor can include two interferometric cavities each having substantially the same fixed optical path length difference, but different phase offsets, to provide the two simultaneous intensity measurements.

The at least one intensity monitor can further include a second interferometric cavity having a second fixed optical path length difference different from the first mentioned fixed optical path length difference. In this case, the output monitor signal includes a simultaneous intensity measurement for each of the first and second fixed optical path lengths at each of two or more different phase offsets.

In such embodiments, the electronic processor can be configured to process the sensor output based on the monitor output signal to account for intensity fluctuations in light output by the source by determining a corrected sensor output based on weighted contributions of the simultaneous intensity measurements from the intensity monitors. Furthermore, the electronic processor can be configured to weight the contributions based on the original sensor output.

Alternatively, the electronic processor can be configured to process the sensor output based on the monitor output signal to account for intensity fluctuations in light output by the source by determining a corrected distance measurement based on weighted contributions of distance measurements for the different interferometric cavities in the intensity monitors. The distance measurement for each of the different interferometric cavities is derived from the simultaneous intensity measurements for each respective interferometric cavity at the different phase offsets. Furthermore, the electronic processor can be configured to weight the contributions based on an original distance measurement derived from the sensor output.

In any of the above embodiments, the interferometer in the sensor module can include a Michelson, Mach Zehnder, Fizeau, Twyman Green, Mirau, Jamin, or fiber optic interferometer.

In any of the above embodiments, the system can include a coupled cavity positioned optically between the light source and the sensor module. For example, the coupled cavity can be configured to separate light from the light source into two portions, direct the two portions along separate paths, and subsequently recombine the portions. The system can further include a phase modulator positioned in the coupled cavity and configured to variably shift the phase of one portion of the light relative to the other portion of the light. For example, the variable phase shift can introduce a heterodyne frequency shift between the two portions of light (e.g., by using a serrodyne modulation).

In any of the embodiments above, the system can further include multiple sensor modules each comprising an interferometer and each coupled to the light source by at least one optical fiber. Furthermore, the system can further include a coupled cavity positioned optically between the light source and the sensor modules. The coupled cavity can be configured to separate light from the light source into two portions, direct the two portions along separate paths, and subsequently recombine the portions, and wherein the system further comprises a phase modulator positioned in the coupled cavity and configured to variably shift the phase of one portion of the light relative to the other portion of the light. The system can further include an optical delay line positioned in the coupled cavity to delay one portion of the light relative to the other portion of the light by an amount larger than a coherence length corresponding to the spectral bandwidth of the light in the coupled cavity. The interferometer in each sensor module defines an optical path length difference that is within the coherence length of the amount introduced by the optical delay line in the coupled cavity. This allows each sensor module to separate a coherent interferometric signal from background noise sources, such as those that would result from spurious reflections.

Embodiments can further include a wavelength filter module positioned optically between the light source and the coupled cavity and configured to pass a selectable broadband portion of the broadband light provided by the light source, and an optional optical amplifier positioned between the wavelength filter module and the coupled cavity.

In general, in another aspect, disclosed herein is a method of monitoring changes in position of an object, the method includes simultaneously i) directing input light to a first plurality of monitor cavities to sample a measurement range of an interferometric sensor at a first plurality of known optical path difference (OPD) values, the first plurality of monitor cavities each detecting an intensity value, and ii) directing input light to the interferometric sensor that interrogates the object. The method includes determining relevant aspects of the spectral distribution of the input light detected by the first plurality of monitor cavities and the intensity monitor. The method includes deriving an uncorrected distance measurement result from the interferometric sensor to determine relevant aspects of the spectral distribution detected by the interferometric sensor. The method includes decomposing the spectral distribution detected by the interferometric sensor into a second plurality of coefficients. The method includes determining a compensation based on measurements made by the first plurality of monitor cavities and the intensity monitor. The method includes applying the compensation to yield a corrected distance measurement of the object. The first plurality of monitor cavities each produces different interference phase values due to different OPD values.

Embodiments of the method can include further measuring an overall intensity fluctuation of the input light using an additional intensity monitor simultaneously with i) and ii), the additional intensity monitor detecting an intensity value and processing the intensity values detected by the first plurality of monitor cavities to yield measured distances before the compensation is applied to yield the corrected distance measurement.

As used herein, "light" refers to electromagnetic radiation in any of the ultraviolet, visible, near-infrared, and infrared spectral regions.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

The disclosed techniques relate to the improvement of any interferometric distance-measuring systems for which the performance is limited by light source intensity noise. For example, the disclosed techniques can reduce the intensity noise of spectrally broadband light sources.

Figure 1:
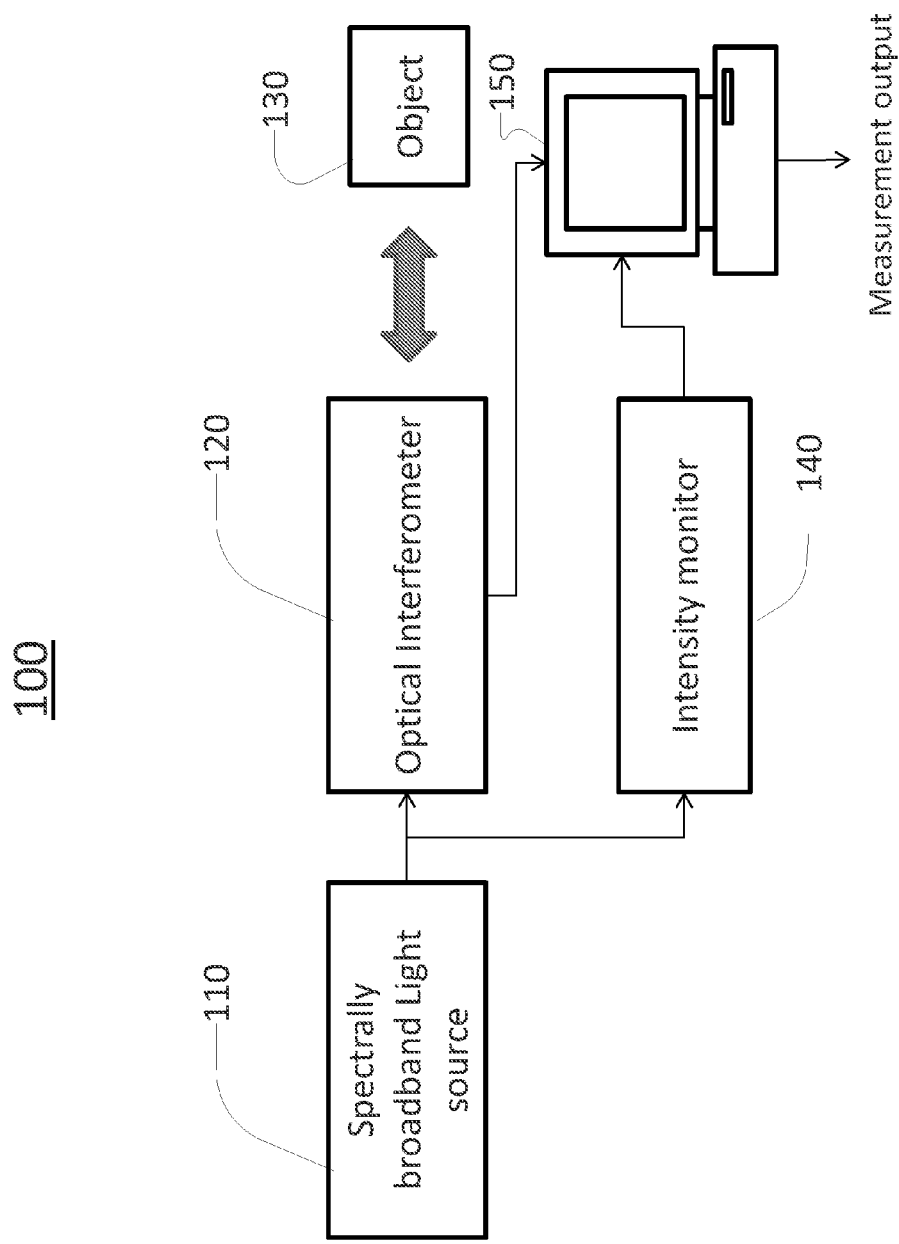
FIG. 1 is an illustration of basic elements of an interferometric system.

A distance and/or displacement-measuring interferometric system 100 for measuring the distance or displacement of an object 130 can include several elements. For example, the system can include a spectrally broadband light source 110, an optical interferometer 120, a light source intensity monitor 140, and a data processing element 150 for using the intensity monitor 140 to correct for fluctuations in the intensity output of the light source 110 when calculating a distance or displacement. Several basic elements of the interferometric system 100 are shown in the example illustrated in FIG. 1.

A variety of interferometers can be chosen to be included in the distance/displacement-measuring interferometric system 100. For example, the interferometric system 100 can include the Zygo Position Sensor (ZPS), described in commonly-owned U.S. Pat. Nos. 7,826,064, 7,639,367, and 7,636,166, the contents of which are incorporated herein by reference. The ZPS is a distributed fiber sensor system that uses a sophisticated interferometric light source and detection system in combination with multiple passive sensors arranged so as to monitor the position of an object.

In some implemenations, the interferometer can be a Michelson, Mach Zehnder, Fizeau, Twyman Green, Mirau, Jamin, fiber optic or any other types of systems. In some implementations, the interferometer can be a coupled-cavity interferometer, which for example is described in commonly-owned U.S. Pat. Nos. 7,826,064, 7,639,367, and 7,636,166.

One application of the interferometric system 100 is the position monitoring of components of a photolithography project lens assembly. The disclosed techniques can be configured reduce the noise level of the interferometric distance-measuring systems beyond the currently-specified performance requirements for demanding applications.

Fluctuations in the interferometer light source 110 can be an important source of measurement noise when measuring distances using optical interferometry. The disclosed techniques can address some of the problems realized by applicants.

Figure 2:
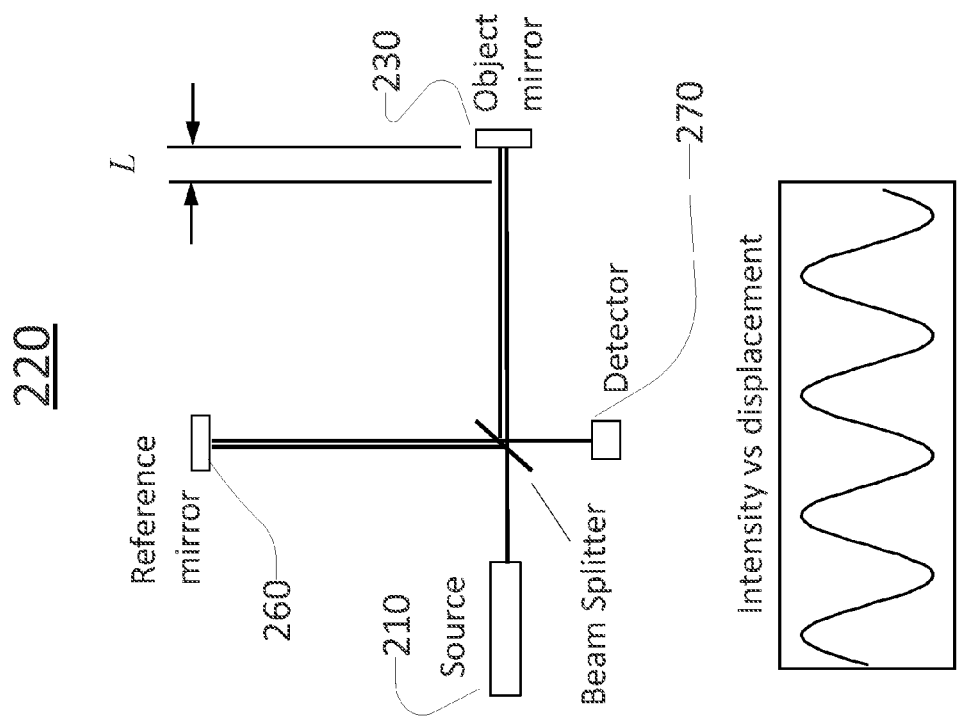
FIG. 2 is a prior art interferometer for measuring distances.

FIG. 2 illustrates an interferometer 220 arranged to measure a distance L to an object 230, by detecting the optical path difference (OPD) between the reference path bounded by a reference mirror 260 and the object 230 or measurement path. The interferometer 220 receives light derived from a source 210, and direct portions of the light along separate paths to the reference mirror 260 and the object 230, and subsequently recombines the portions of light. A detector 270 measures the recombined light portions and produce an output signal. An exemplary variation of the intensity of the output signal as a function of displacement is plotted in the lower portion of FIG. 2. The light source 210 is spectrally broadband, having a range of emission wavelengths that for the purpose of modeling the interferometer 220, the wavelengths can be binned into discrete values $\lambda_i$ and corresponding wavenumbers $k_i = 2\pi/\lambda_i$, where i=0, 1 ... M-1, and M is the total number of wavelengths considered in the model. The total intensity as viewed by the detector is $$I = \sum_{i=0}^{M-1} \rho_i \qquad (1)$$

where the contribution from each wavelength $\lambda_i$ is $$\rho_i = q_i[1 + V\cos(2k_iL + \phi)]. \qquad (2)$$

In Eq. (2), $q_i$ is the spectral distribution, defined as the strength of the light source 210 at a wavenumber $k_i$, V is the interference fringe contrast, and $\phi$ is a nominally wavelength-independent phase offset resulting from phase change on reflection or other phase contribution that vary slowly with wavelength in comparison to the factor $2k_iL$. The measurement of the distance L follows from multiple intensity measurements. In one method, known in the art as heterodyne or phase shifting interferometry (Malacara, 1998), the intensity measurements are timed in sequence with controlled phase shifts. Consequently, noise in these intensity measurements propagates to noise in the final measurement, and the precision with which the distance L can be measured depends in part on the stability of the light source (Brophy, 1990).

When the light source is substantially monochromatic, that is, having only one emission wavelength $\lambda$; there is only one intensity contribution q and a method for compensating this intensity fluctuation $\delta q$ is to measure this intensity noise and include it in subsequent phase estimation techniques.

In the case of a spectrally broadband light source having a range of wavelengths $\lambda_i$, and therefore a range of intensity contributions $q_i$, the prior art does not provide a solution to the correction of intensity noise. For example, the spectrally broad light source 210 can have a bandwidth of 0.1 nm or larger. In particular, many sources of broadband illumination have the property that the intensity fluctuations $\delta q_i$ in the intensity $q_i$ of one wavelength $\lambda_i$ are not correlated to fluctuations $\delta q_j$ of other intensity contributions $q_j$ at wavelength $\lambda_j$ where i≠j. Common examples are thermal sources such as incandescent light bulbs, and spontaneous emission sources that employ high-gain materials pumped optically or electronically without coherent feedback. For such sources, the total intensity $I_o$ of the light source can be measured as $$I_0 = \sum_{i=0}^{M-1} q_i \qquad (3)$$

which does not directly provide sufficient information to solve for the intensity fluctuations in each of the contributions $q_i$.

Figure 3:
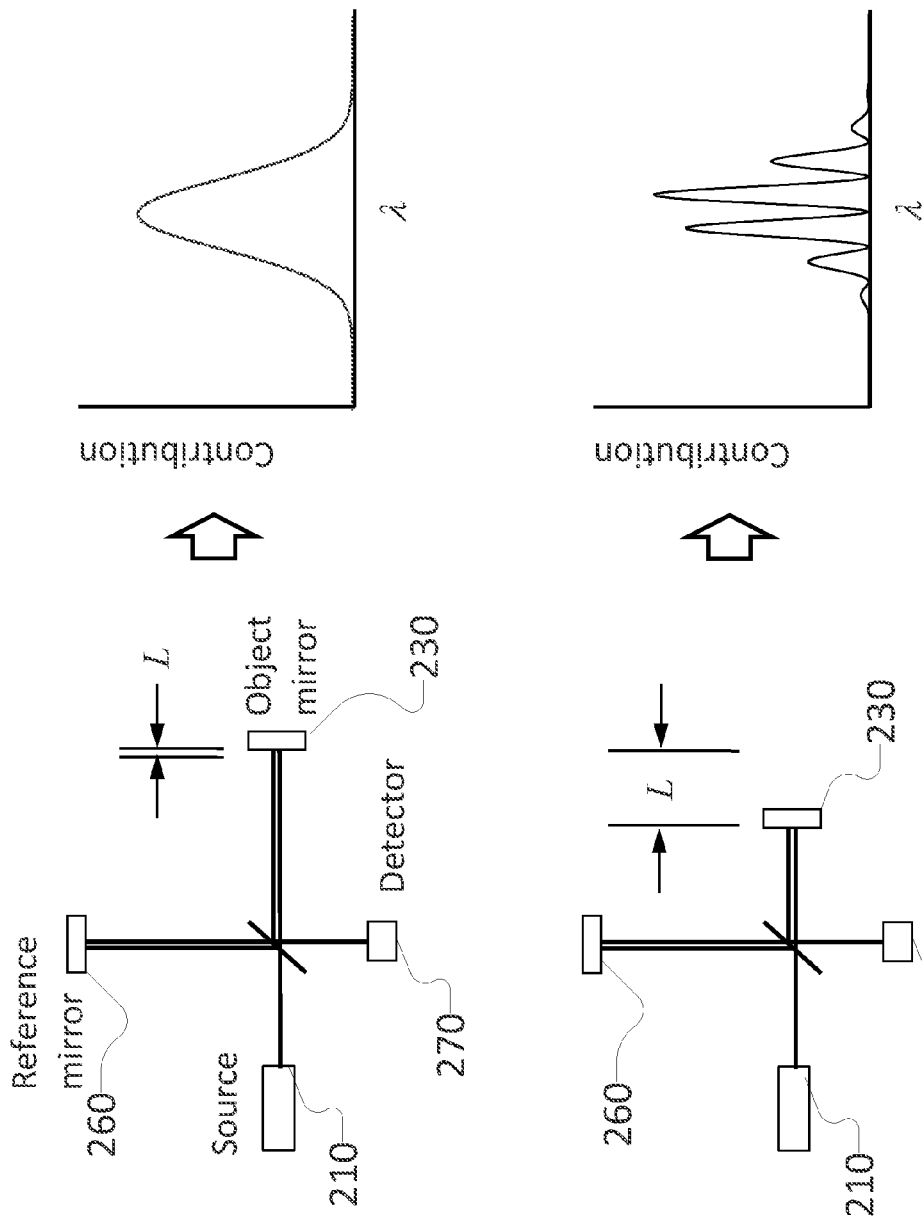
FIG. 3 shows examples of interference contrast under broadband illumination

FIG. 3 shows the contribution $\rho_i$ to the total intensity I as a function of wavelength $\lambda_i$ for two different nominal values for the optical path difference 2L. In the upper diagram of FIG. 3, the value of L is small enough that the intensity contribution does not vary significantly from one wavelength to the other. In this case, it may be sufficient to monitor the total intensity as in Eq. (3). In the lower diagram of FIG. 3, however, the optical path difference 2L is such that the phase contribution $2Lk_i$ varies through several cycles of phase for all of the wavelength values $\lambda_i$ for i=0, 1 ... M-1. In this case, the individual intensity contributions $\rho_i$ vary with wavelength because of the wavelength dependence of the phase in addition to the spectral distribution $q_i$. Thus, it is desirable to have spectrally-resolved information of the intensity fluctuations $\delta q_i$ and not only have the integrated value $I_0$ of all $q_i$, where i=0, 1 ... M-1.

The interferometer shown in FIG. 3, as well as Eq. 3, illustrate how spectral contributions vary as the optical path difference L changes. In practice, the shown interferometer as a displacement measuring device would be suited for a limited range of L, that is, to ranges on the scale of the coherence length of the light source. Modifications to the hardware, such as the addition of a coupled cavity, can provide modulation for alternative ranges of L.

Figure 4:
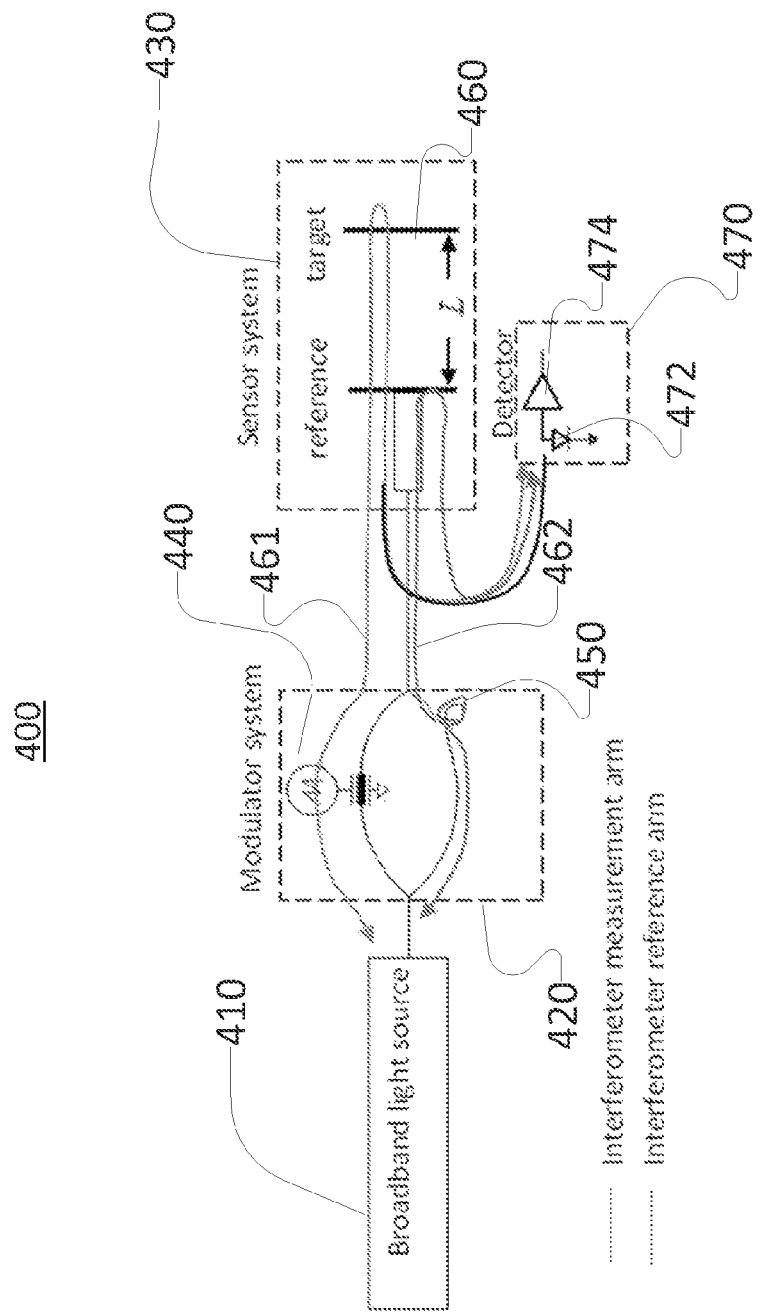
FIG. 4 is an illustration of a coupled-cavity interferometer for measuring distances.

An example of a coupled cavity type interferometric system 400, which is similar to several known types of interferometer (Liu et al., 1993), is shown in FIG. 4. A short-coherence (broadband or BB) light source 410 feeds two arms of a phase modulator system 420 (also described as one of the two cavities of the coupled-cavity system 400, the other cavity being the sensor 430). One arm of the phase modulator system 420 contains a device 440, capable of rapidly changing the phase delay. The device 440 may be for example an electro-optic or acousto-optic modulator. The other arm of the phase modulator system 420 contains an optical delay 450. The OPD between the arms is chosen to exceed the coherence length of the source 410 and to match the OPD of the sensor 430 when its target 460 is at the chosen nominal standoff. The sum of the optical paths through the short-arm of the phase modulator system 420 and the long-arm of the sensor 430 (i.e., interferometer measurement arm) equals the sum of the optical paths through the long arm of the phase modulator system 420 and the short arm of the sensor 430 (i.e., interferometer reference arm) when the sensor target 460 is at its nominal standoff. This condition is referred to as the zero optical path difference (ZOPD) condition. The ZOPD condition occurs when the OPD of the phase modulator system 420 equals the OPD of the sensor 430.

The phase-modulated light traveling through the interferometer's measurement arm 461 mixes with the light traveling through the interferometer's reference arm 462 resulting in a modulated intensity signal at a detector 470, which is converted to an electrical signal via a photo-detector 472 and an amplifier 474. Motion of the sensor target 460 is encoded in the phase of this electrical signal. The phase of this electrical signal may be extracted, using one of many phase-processing algorithms, resulting in the measurement of the sensor target motion.

In the example shown in FIG. 4, the intensity noise modulates the phase of the measurement signal. The resulting phase noise constituents residing inside the bandwidth of the phase measurement signal processing result in a measurement error.

Figure 5:
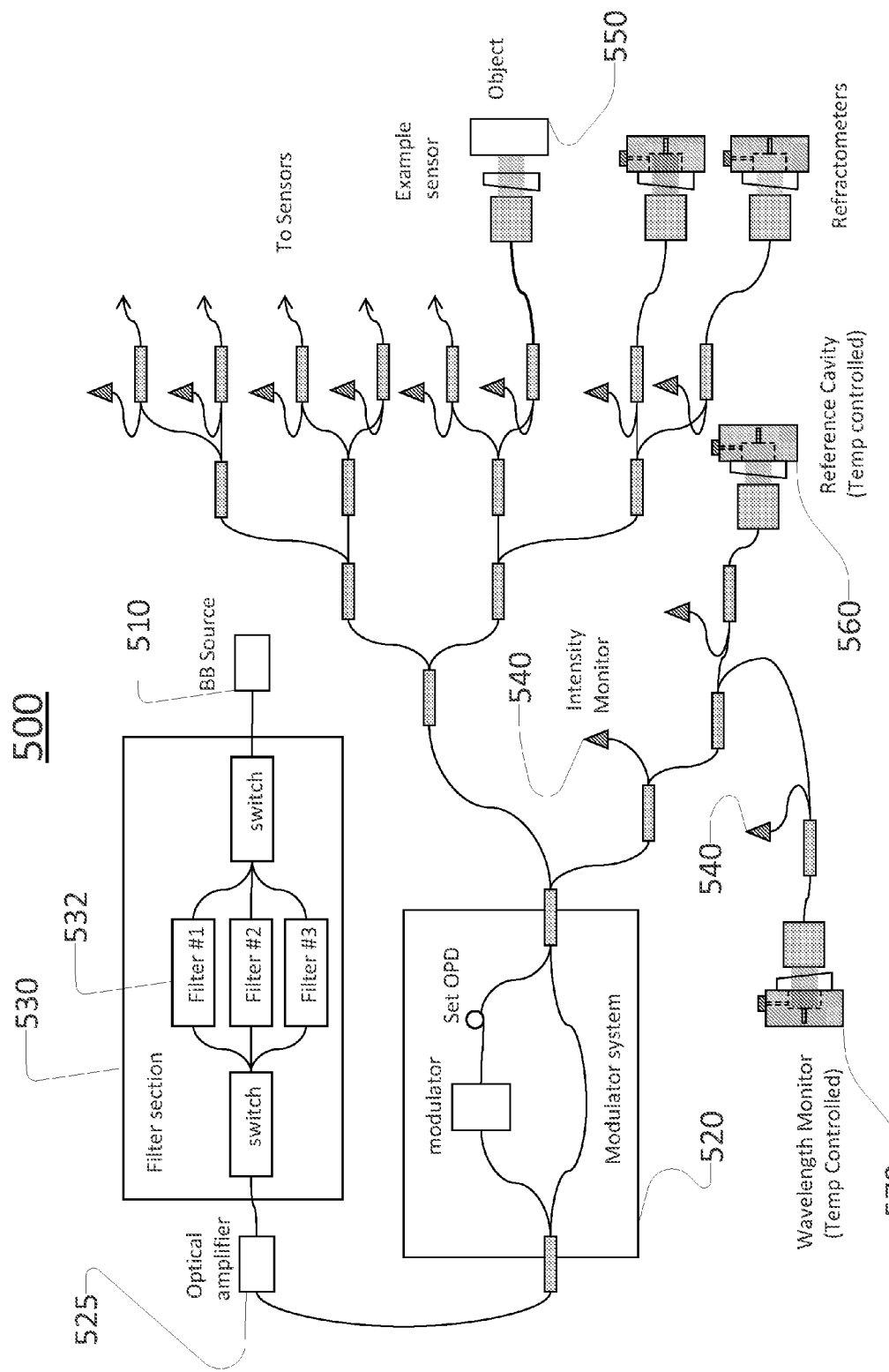
FIG. 5 is an illustration of an exemplary coupled-cavity interferometer for position monitoring.

FIG. 5 illustrates an exemplary distributed fiber-optic, coupled-cavity type interferometric system 500 used to measure the distance of an objective 550, which is described in commonly-owned U.S. Pat. Nos. 7,826,064, 7,639,367, and 7,636,166 (the '064 patents), incorporated herein by reference. In FIG. 5, similar to the coupled-cavity interferometer 400 of FIG. 4, there is a modulator system 520 that separates a light source 510 into two distinguishable arms by a difference in optical delay. There is additionally a heterodyne frequency shift between the two channels, as described in the context of FIG. 4. In accordance with the '064 patents, the OPD is compensated in each one of the sensors so as to produce an interference signal at the corresponding detector. FIG. 5 also shows a filter section 530 containing filters 532 for selecting two or more center wavelengths, for the determination of absolute distance, as described in the '064 patents. For each of these center wavelengths, the filters 532 pass what may still be considered as spectrally broadband light with a coherence length smaller than the OPD of the modulator system 520. The effect of intensity noise from wavelength to wavelength is not addressed in the '064 patents. An optical amplifier 525 is positioned between the wavelength filter section 530 and the modulator system 520. The interferometric system 500 also includes a wavelength monitor 570, and a reference cavity 560 both of which are temperature controlled.

In some implementations, the interferometric system 500 can include one or more intensity monitors 540 that measure the fluctuations in intensity output of the light source 510 as a function of source wavelength, and the data processing element (not illustrated) receives this wavelength-dependent information and correct for the fluctuations in the calculation of distance or displacement. For example, the intensity monitor 540 can be of any one of several types, such as spectral analyzers based on prisms, wavelength filters, diffraction gratings, scanning Fabry-Perot etalons, fixed etalons or additional interferometers.

In some implementations, additional information different from the total intensity noise fluctuations of the light source 510 are obtained in order to account for intensity noise in broadband sources.

The disclosed techniques provide an apparatus and method for establishing the following parameters shown in Eq. (2):
1) The fringe visibility V
2) The nominal distance L so as to determine the wavelength-dependency of the contributions $2k_iL$;
3) The relatively wavelength-independent phase offset $\phi$ with respect to the nominal contribution $2k_iL$;
4) The intensity $q_i$ of each of the wavelengths $\lambda_i$ which makes up the final interference intensity in each intensity sample.

Figure 6:
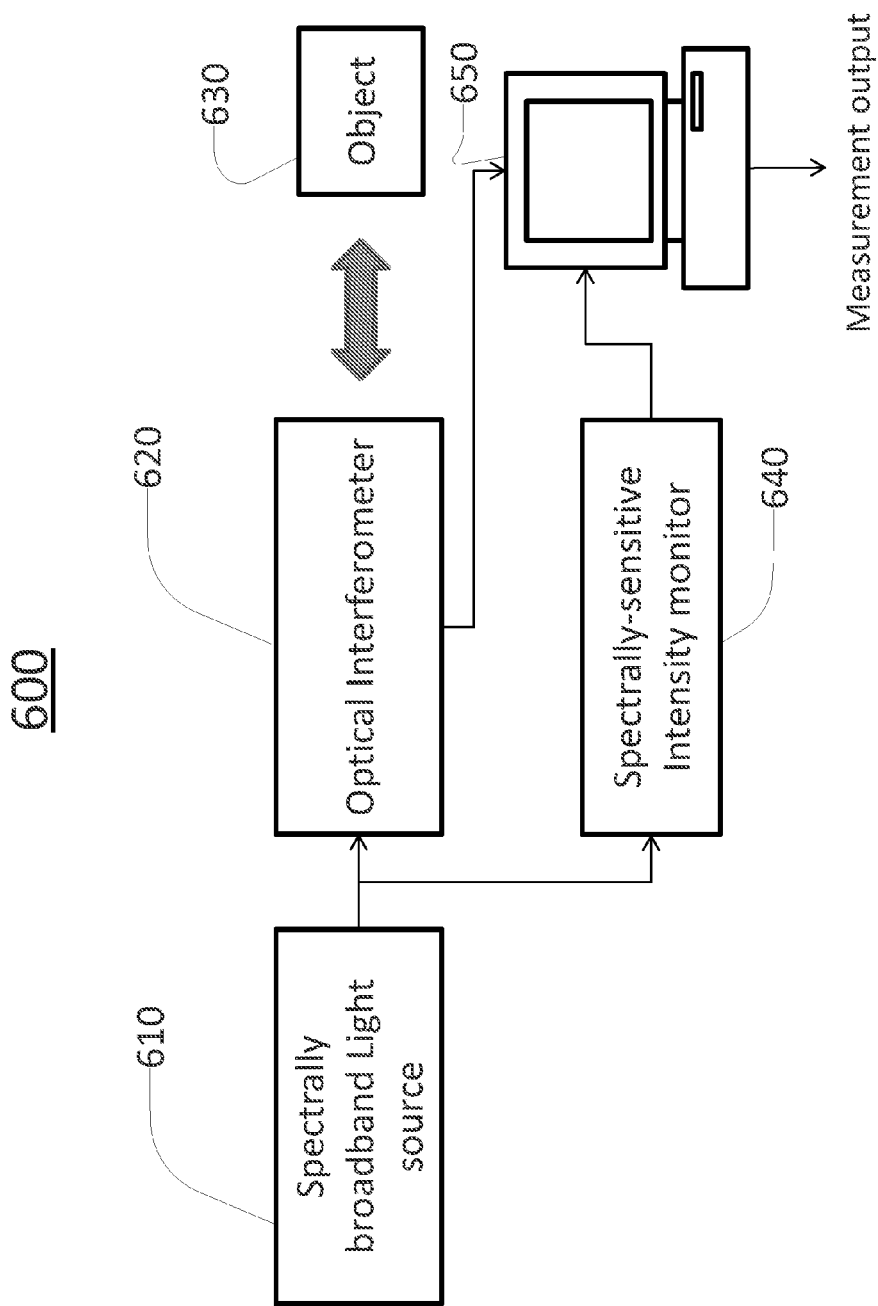
FIG. 6 is an illustration of an interferometric system that includes a spectrally-sensitive intensity monitor.

The fringe visibility V, the nominal distance L, and the phase offset $\phi$ can be estimated by design or by preliminary measurements. Then there remains the task of measuring the wavelength-dependent intensity $q_i$, and in particular, the fluctuations $\delta q_i$ of intensity $q_i$. In the example illustrated in FIG. 6, an interferometric system 600 includes a spectrally broadband source light 610. A portion of the spectrally broadband source light 610 is split and directed into a spectrally-sensitive intensity monitor 640 that includes elements for measuring the intensity of each wavelength component independently. For example, the intensity monitor 640 may be a spectrometer.

A data processing element 650 calculates the total intensity fluctuation $\delta I$ as seen by a sensor (e.g., optical interferometer 620) using the intensity monitor 640, the wavelength-dependent fluctuations $\delta q_i$ and the nominal values of the phase $2k_iL+\phi$. For example, for the interferometer 220 shown in FIG. 2, the calculation may be the following:

$$\delta I = \sum_{i=0}^{M-1} \delta q_i [1 + V\cos(2k_iL + \varphi)]. \qquad (4)$$

A similar formula applies to the case of a coherence coupled interferometer, for example, as shown in FIG. 4 and FIG. 5, with L being redefined as the distance from the zero optical path difference (ZOPD) position.

Figure 7:
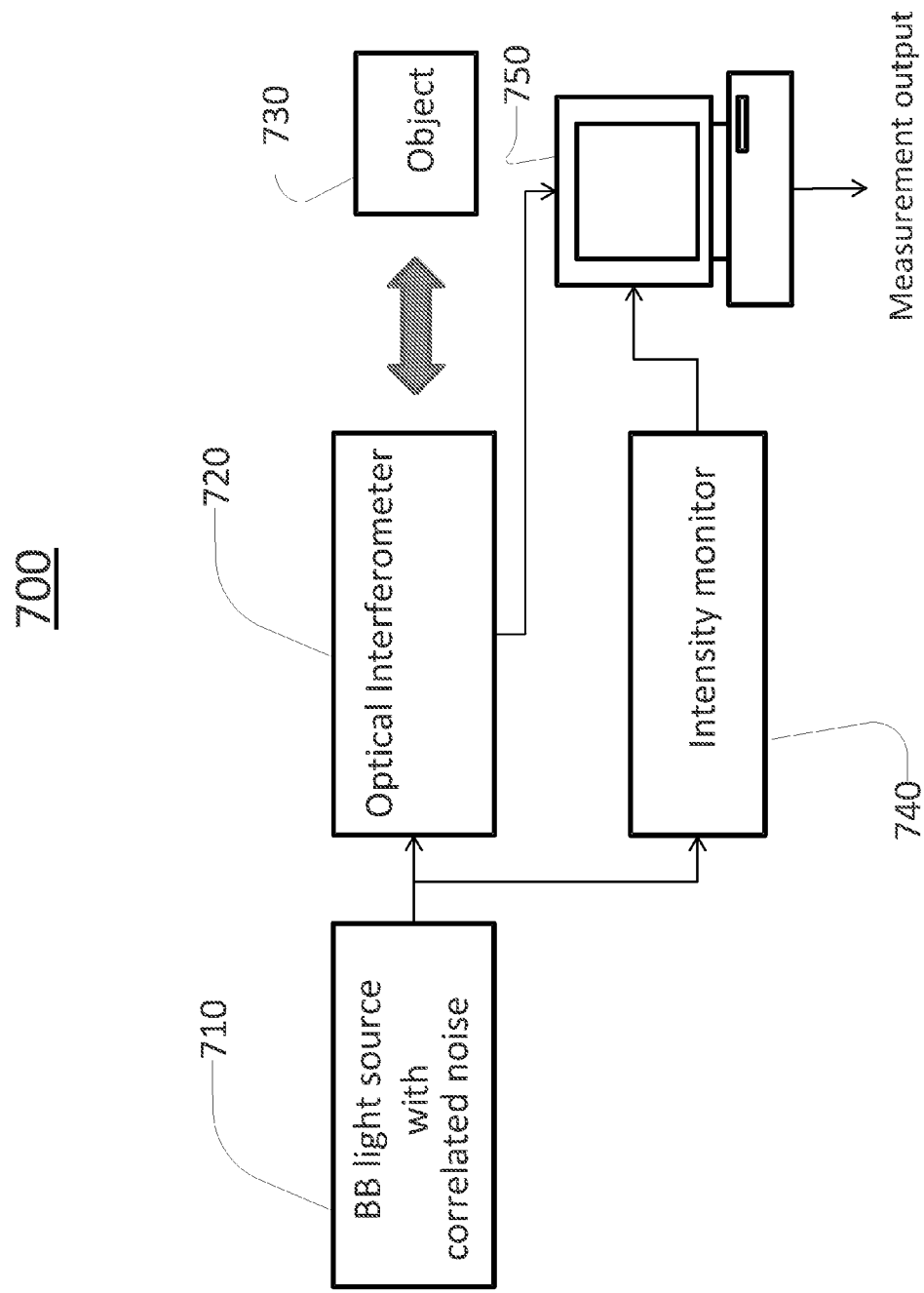
FIG. 7 is an illustration of an interferometric system that includes a spectrally broadband source having correlated noise across its emission bandwidth.

In some implementations, an interferometric system 700 as illustrated in FIG. 7 includes a spectrally broadband light source 710 of a type for which the intensity fluctuations are correlated across the spectral bandwidth employed by the interferometric system 700. In this case, an intensity monitor 740 which is not spectrally-resolving can be used. A data processing element 750 receives this wavelength-dependent information and correct for the fluctuations in the calculation of distance or displacement of an object 730. In some implementations, the light source 710 can be of any one of several types, including the following:
1) Broadband coherent light source such as a femtosecond laser or other device, optionally combined with an optical amplifier
2) Rapidly tuned laser over a broad spectral bandwidth
3) Array of phase-locked lasers In some implementations, the interferometric system 700 includes a spectrally broadband light source 710 designed, modified or controlled so that the intensity fluctuations $\delta q_i$ of the spectral components $q_i$ are correlated; that is, the values of $\delta q_i$ are dependent upon a common factor which is directly measurable without spectral decomposition. For example, the relative fluctuations $\delta q_i/q_i$ at a particular wavelength $\lambda_i$ may all be directly proportional to fluctuations $\delta I_0$ in the total intensity $I_0$ expressed in Eq. (3) as the sum of all of the spectral contributions $q_i$. The values $\delta q_i$ in Eq. (4) are determined from a single measurement of $\delta I_0$, and in the case where for all i=0, 1 ... M−1

$$\delta q_i/q_i = \delta I_0/I_0, \quad (5)$$

then the following holds:

$$\delta I \propto \delta I_0. \quad (6)$$

In some implementations, the light source 710 can include a laser, where the fundamental light producing process (stimulated as opposed to spontaneous emission) forces correlation between the wavelength components. In some implementations, the light source 710 can include narrow-band lasers, such as semiconductor Fabry-Perot type lasers, mode-locked to build up a broader band (Smith, 1970). Because they are mode-locked, the intensity noise of any line is correlated to any other and therefore correlated to the total intensity. In some implementations, the light source 710 can include a femtosecond laser (Sibbett, 2012). Femtosecond lasers provide a broad band of dense mode-locked emission lines (called a frequency comb) that can emulate a continuous spectrum. Because they are mode-locked, the intensity noise of any line is correlated to any other and therefore correlated to the total intensity. Thus a measurement of the total intensity fluctuation can be used for intensity noise compensation of any spectral band within the comb.

In some implementations, the interferometric system includes one or more intensity monitors designed to have similar intensity noise sensitivity to the measurement interferometer, and the data processing element receive this information and correct for the fluctuations in the calculation of distance or displacement. In one example, each intensity monitor is arranged as an interferometer having nominally the same optical path difference as the measurement interferometer, but with a fixed object distance. Two or more simultaneous intensity measurements at different phase offsets, for example in quadrature, provide the information for compensating for intensity fluctuations for measurements at this optical path difference. In some implementations, the interferometric system can include one or more of the following features:
1) Two or more separate intensity monitors;
2) Intensity monitors capable of acquiring data simultaneously at multiple phase shifts;
3) Intensity monitors that are substantially of the same structure as the measurement interferometer itself, but with fixed object position.

The intensity monitors can be designed to have similar intensity noise sensitivity as the measurement interferometer in order to measure the impact of spectral noise. These intensity monitors may be constructed as interferometers with fixed optical path lengths so that their response emulates the response of the measurement interferometer. The advantage of such arrangements can be seen in Eq. (2); the effective spectrum seen by the detector of a distance measuring interferometer is a function of distance L, which makes the appropriate intensity compensation a function of distance L as well.

Figure 8:
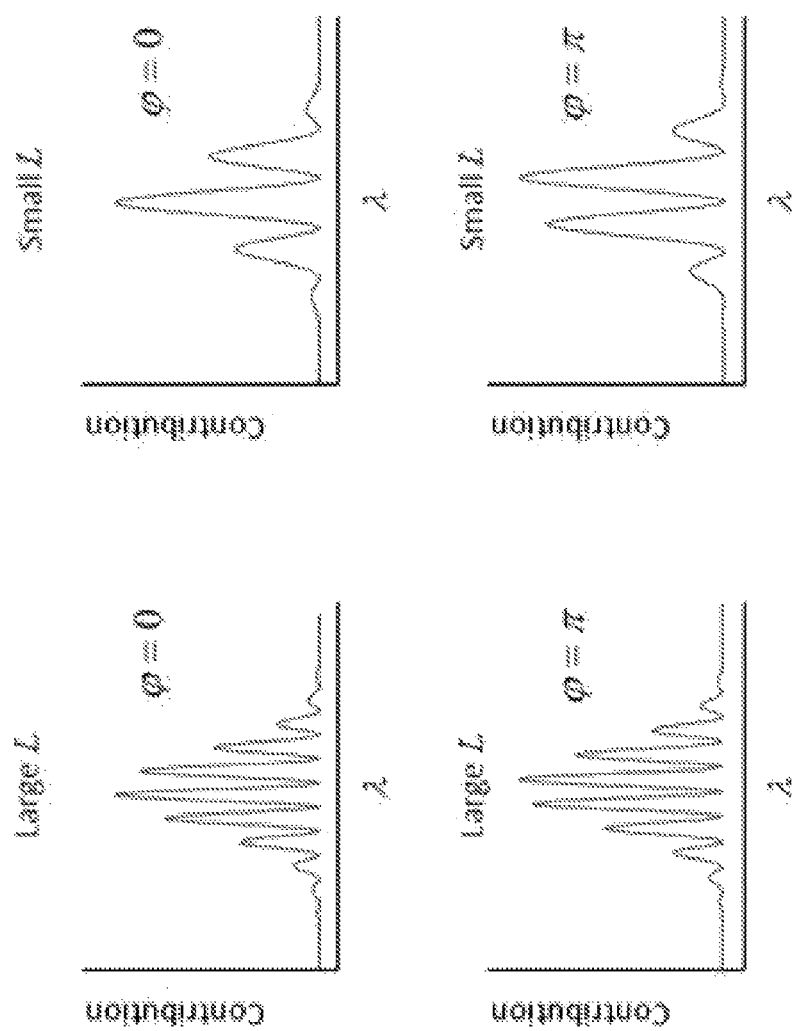
FIG. 8 illustrates the influence of object distance and phase offset on the wavelength-dependent contributions to the total detected intensity.

When a sensor (e.g., interferometer) measures the position of an object at a nominal position L, disregarding other potential sources of phase shift, the relatively wavelength-independent phase offset $\phi$ can be expressed as $$\phi = \Delta L \bar{k}, \quad (7)$$

where $\bar{k}$ is the mean wavenumber, $\Delta L$ is a small change in the distance of the object with respect to L. The value of "small" is such that the wavelength dependence of the phase offset $\phi$ is substantially less than one $2\pi$ cycle of phase over the bandwidth of the filtered light source (for example, as shown in FIG. 5), corresponding to displacements $\Delta L$ that are a few wavelengths or tens of wavelengths at most, depending on the source bandwidth. In the example illustrated in FIG. 8, intensity contributions as a function of wavenumber for different values of the nominal position L and the phase offset $\phi$ are shown. The value of L determines how rapidly the spectral contributions vary with wavelength. A larger value of L yields a more rapidly varying spectral contribution. The phase offset $\phi$ shifts these contributions laterally along the wavelength axis without modifying the modulation structure (e.g., envelope) associated with a particular nominal position L.

In some implementations, an intensity monitor includes a dedicated sensor or combination of sensors with a fixed monitor distance L' and at least two values for the monitor phase offset $\phi'$. The integrated sum of all the intensity contributions corresponding to these at least two values of monitor phase offset $\phi'$ (at the common fixed distance L') are measured. A first estimate of the object distance L and the phase offset $\phi$ for a sensor that is monitoring an object position can be made, under the assumption that the object distance L is close to the monitor value L'. Based on the first estimate, the data processing element can calculate the intensity noise $\delta I$ by forming a combination of the values corresponding to the at least two values of monitor phase offset $\phi'$.

Figure 9:
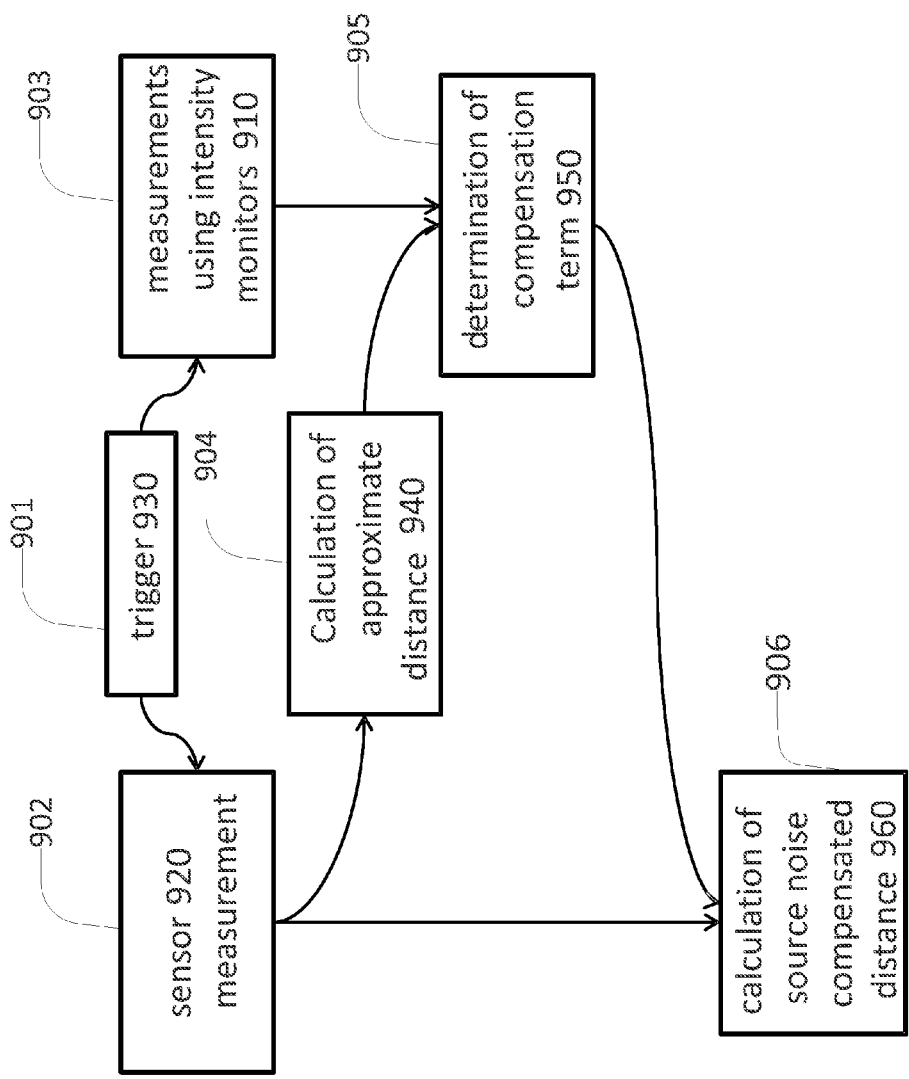
FIG. 9 is a flow chart showing an exemplary method of using an interferometric system.

FIG. 9 illustrates an exemplary method that uses intensity monitors 910 to emulate the response from a measurement interferometer 920. In step 901, a trigger signal 930 is sent to both a sensor (i.e., the measurement interferometer 920) and the intensity monitors 910. In steps 902 and 903, distance measurements are made by the measurement interferometer 920 and the intensity monitors 910, respectively. The steps 902 and 903 are executed simultaneously. Based on the data received from the measurement interferometer 920, an approximate (i.e., uncorrected) distance 940 is calculated in step 904. Using the data acquired by the intensity monitors 910 and the approximate distance 940, a compensation term 950 is determined in step 905. The compensation term 950 is then used, together with the measurement results obtained in step 902 from the measurement interferometer 920 to calculate, in step 906, a compensated distance 960 that takes into account noise from the light source.

Figure 10:
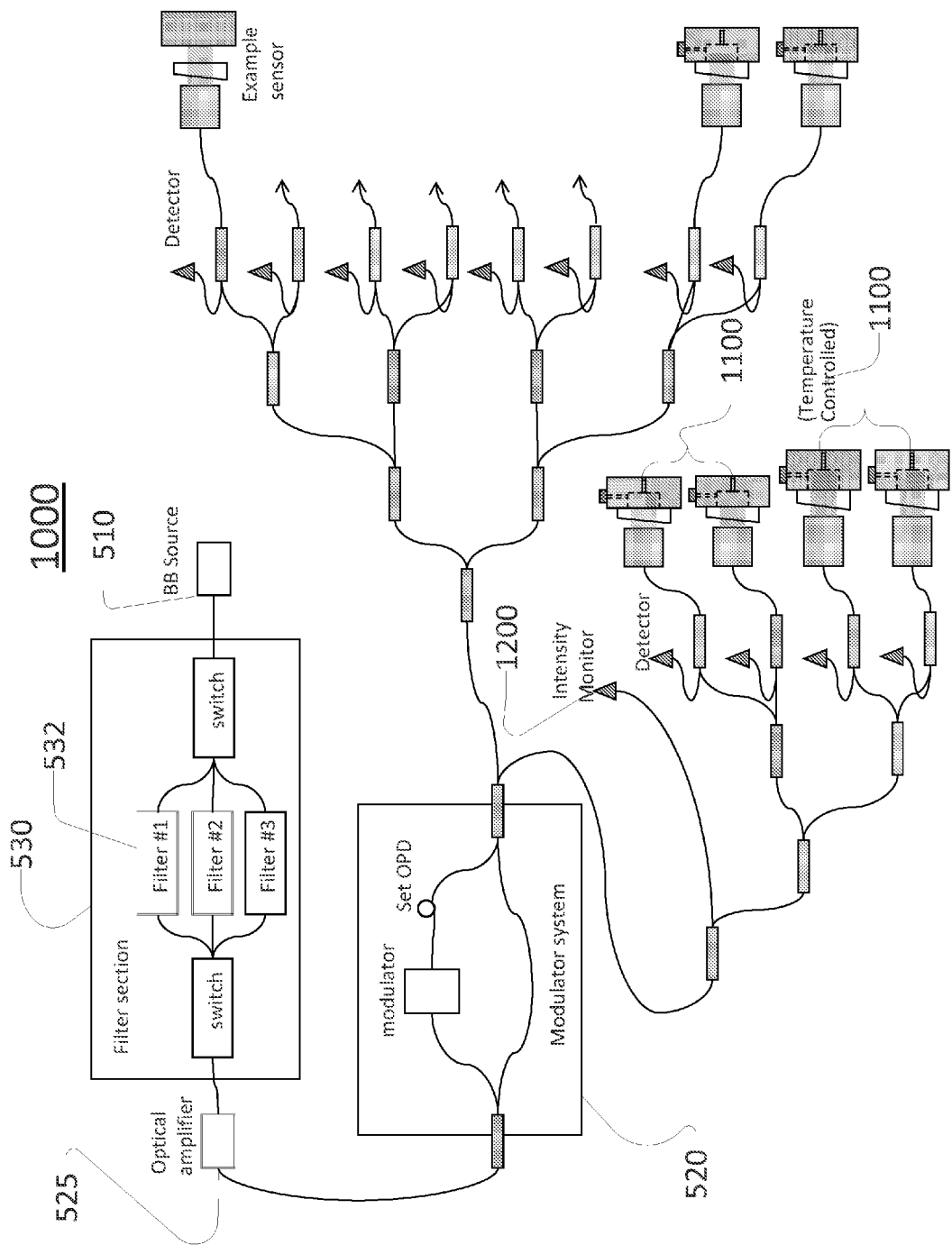
FIG. 10 is an illustration of basic elements of an interferometric system.

FIG. 10 shows an exemplary interferometric system 1000 using intensity monitors 1200 that emulate the interferometer response. Compared to the interferometric system 500 shown in FIG. 5, in-quadrature intensity monitor cavity pairs 1100 at a variety of cavity lengths have been added. Elements which are common to those shown in the interferometric system 500 are labeled with the same reference numerals. The reference cavity 560 and the wavelength monitor 570 in FIG. 5 have been omitted since their purpose can be served with the intensity monitor cavities 1100. The intensity monitor cavities are temperature controlled. The intensity monitor 1200 can be identical to intensity monitor 540.

In some implementations, the interferometric system uses intensity monitors that emulate the response of the measurement interferometer (sensor). In certain embodiments, the calculation of the appropriate compensation can be expressed as the following:
1. Provide monitors that sample the effect of spectral noise in OPD space (i.e., for different values of OPD)
2. Measure signals from the monitors simultaneously with the signal of interest (e.g., the intensities measured at each detector)

3. Decompose the signal of interest into the signals provided by the monitors
4. Compose a compensation term from the measured fluctuations and apply it to the signal of interest In one example, the raw intensity data is corrected and then further processed, as described in the following:
1. N pairs of monitor cavities sample the measurement range of an interferometric sensor of interest at 2N known OPD values. An additional intensity monitor (without a cavity) can optionally be used to measure the overall intensity fluctuations ($\delta I_0$ of Eq. 6) of the light source. In some embodiments, the monitor cavities are provided as three monitors etalons separated by 120° phase shifts at each OPD instead of having a pair of monitor cavities at each OPD in quadrature. For all these 2N+1 monitors, the spectral distributions are calculated or measured. The N pairs of cavities have slightly different OPD values leading to different interference phase values, for example, the phase values may be in quadrature. This is to provide less linearly dependent fit function for a later fit procedure.
2. All the 2N+1 monitors and the sensor of interest simultaneously record intensity values.
3. The sensor of interest first provides an uncorrected distance measurement which allows the calculation of the spectral distribution that the sensor sees. Using for example a least squares fit, that spectral distribution is decomposed into the 2N+1 monitor spectra, resulting in 2N+1 coefficients $c_n$. Alternatively, the decomposition can be done in advance and the coefficients be made available in a lookup table. In some cases there may be an analytical expression for the coefficients.
4. The values $I_n$, where n=1 ... 2N+1 measured by each of the 2N+1 intensity monitors are compared to their long time average $\langle I_n \rangle$ (in serrodyne or heterodyne systems, the intensity is compared to the long time average for a given serrodyne or heterodyne phase). By weighing the observed fluctuations with the previously determined coefficients $c_n$, an intensity compensation factor $I_{corr}$ is applied to the intensity of the sensor of interest/as in $$I_{corr} = I \sum_{n=1}^{2N+1} c_n \langle I_n \rangle \bigg/ \sum_{n=1}^{2N+1} c_n I_n \qquad (8)$$

where $\langle \ \rangle$ is a symbol for the long time average. After this correction, the intensity data of the sensor of interest can be further processed.

In another example, the correction is applied on position measurement results, as described in the following:
1. N pairs of monitor cavities sample the measurement range of an interferometric sensor of interest at N known OPD values. The pairs of cavities have slightly different OPD values leading to different interference phase values, for example, the phase values may be in quadrature.
2. All the intensity monitors and the sensor of interest make simultaneous measurements which are then further processed to yield measured distances.
3. The sensor of interest first provides an uncorrected distance measurement D. Based on previous measurements or simulations of measurements at that same or similar distance, it is known how the sensor's fluctuations correlate with the monitors' fluctuations due to source noise. In practice, the measured distance fluctuations of the sensor of interest can be decomposed into distance fluctuations reported by the monitors using for example a least squares fit. That information is tabulated and now available as a set of coefficients $c_n$.
4. The distance measurements $D_n$ of the monitors are compared to their long time average $\langle D_n \rangle$. By weighing the observed fluctuations with the previously retrieved coefficients $c_n$, a distance compensation term $D_{corr}$ is applied to the reported outcome D of the sensor of interest as in $$D_{corr} = D - \sum_{n=1}^{2N} c_n (D_n - \langle D_n \rangle) \qquad (9)$$

where $\langle \ \rangle$ is a symbol for the long time average.

In general, the disclosed interferometric systems can be used to monitor the position of a variety of different optical components in an exposure system for microlithography, including, e.g., the projection objective assembly. Optical components include refractive optical components, reflective optical components, and/or diffractive optical components. For example, in a dioptric PO assembly, interferometric systems can be used to monitor the position of the lenses, which are an example of refractive components, in the assembly. In catoptric PO assembly assemblies, interferometric systems can be used to monitor the position of mirrors, which are an example of reflective components, in the PO assembly. Furthermore, interferometric systems can be used to monitor the position of other components, such as polarizers, gratings, etc. Moreover, interferometric systems can be used to monitor the position of optical components in optical systems in addition to PO assembly assemblies. For example, in a photolithography tool, interferometric systems may be used to monitor the position of one or more components in an illumination system alternatively or additionally to components in the PO assembly. For example, the changes in the position of the wafer stage or the reticle stage can be monitored.

The features of the data processing element can be implemented in digital electronic circuitry, or in computer hardware, firmware, or in combinations of these. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display) monitor, e-Ink display or another type of display for displaying information to the user and a keyboard and a pointing device such as a mouse or a trackball by which the user can provide input to the computer.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results.

What is claimed is:

1. An interferometry system for monitoring changes in position of an object, the system comprising:
   a. a spectrally broadband light source;
   b. at least one sensor module, each sensor module comprising an interferometer configured to receive light derived from the source, direct portions of the light along separate paths, and subsequently recombine the portions of light,
   wherein at least one of the paths contacts the object and wherein each sensor module further comprises a detector configured to measure the recombined light portions and produce a sensor output signal;
   c. at least one intensity monitor, each intensity monitor comprising a detector configured to measure an intensity of additional light derived from the source and produce a monitor output signal, wherein the intensity monitor is configured to characterize intensity fluctuations in a spectrally sensitive way, the intensity monitor comprises a first plurality of monitor cavities to sample a measurement range of the sensor module at a first plurality of known optical path difference (OPD) values; and
   d. an electronic processing module configured to receive the sensor output signal and the monitor output signal, process the sensor output signal based on the monitor output signal to account for intensity fluctuations in light output by the source, and determine information about the changes in the position of the object using a compensation determined based on measurements made by the first plurality of monitor cavities to yield a corrected distance measurement of the object, wherein the first plurality of monitor cavities each produces different interference phase values due to different OPD values.

2. The system of claim 1, wherein the intensity monitor is configured to characterize the intensity fluctuations as a function of wavelength by measuring the intensity at multiple different spectral channels.

3. The system of claim 1, wherein the broadband source comprises a broadband coherent light source, a rapidly tuned laser over a broad spectral bandwidth, or an array of phase-locked lasers.

4. The system of claim 1, wherein the electronic processing module is configured to process the sensor output signal based on the monitor output signal and information about spectral correlation when determining the information about the changes in the position of the object.

5. The system of claim 1, wherein each monitor cavity comprises an interferometric cavity having a first fixed optical path length difference.

6. The system of claim 5, wherein the monitor output signal comprises two or more simultaneous intensity measurements for the first fixed optical path length difference at different phase offsets, and the first plurality of monitor cavities comprises two or more interferometric cavities each having substantially the same fixed optical path length difference, but different phase offsets, to provide the two or more simultaneous intensity measurements.

7. The system of claim 5, wherein the first plurality of monitor cavities comprises a second interferometric cavity having a second fixed optical path length difference different from the first fixed optical path length difference and the monitor output signal comprises a simultaneous intensity measurement for each of the first and second fixed optical path lengths at each of two or more different phase offsets.

8. The system of claim 5, wherein the electronic processor is configured to process the sensor output based on the monitor output signal to account for the intensity fluctuations in light output by the source by determining a corrected value based on weighted contributions of the simultaneous intensity measurements from the intensity monitors, wherein the corrected value is selected from the group consisting of a corrected sensor output and a corrected distance measurement, and when the corrected value is a corrected distance measurement, the corrected distance measurement is based on weighted contributions of distance measurement fluctuations for the different interferometric cavities in the intensity monitors, wherein the distance measurement for each of the different interferometric cavities is derived from the simultaneous intensity measurements for each respective interferometric cavity at the different phase offsets.

9. The system of claim 8, wherein the electronic processor is configured to weigh the contributions based on an original sensor output or an original distance measurement derived from the sensor output.

10. The system of claim 1, wherein the interferometer comprises a Michelson, Mach Zehnder, Fizeau, Twyman Green, Mirau, Jamin, or fiber optic interferometer.

11. The system of claim 1, wherein the intensity monitor configured to measure the intensity at multiple different spectral channels comprises a prism, a wavelength filter, a diffraction grating, a scanning Fabry-Perot etalon, a fixed etalon, or an additional interferometer.

12. The system of claim 1, further comprising a coupled cavity positioned optically between the light source and the group consisting of at least one sensor module and at least one intensity monitor, wherein the coupled cavity is configured to separate light from the light source into two portions, direct the two portions along separate paths, and subsequently recombine the portions, further comprising a phase modulator positioned in the coupled cavity and configured to variably shift the phase of one portion of the light relative to the other portion of the light.

13. The system of claim 12, wherein the variable phase shift is selected from the group consisting of a serrodyne modulation and a heterodyne frequency shift between the two portions of light.

14. The system of claim 12, further comprising an optical delay line positioned in the coupled cavity to delay one portion of the light relative to the other portion of the light by an amount larger than a coherence length corresponding to a spectral bandwidth of the light in the coupled cavity, and wherein the interferometer in each sensor module defines an optical path length difference that is within the coherence length of the amount introduced by the optical delay line in the coupled cavity.

15. The system of claim 1, further comprising multiple sensor modules each comprising an interferometer and each coupled to the light source by at least one optical fiber.

16. The system of claim 15, further comprising a wavelength filter module positioned optically between the light source and the coupled cavity and configured to pass a selectable broadband portion of the broadband light provided by the light source.

17. The system of claim 15, further comprising an optical amplifier positioned between the light source and the sensor modules.

18. The system of claim 1, wherein the spectrally broadband source provides light spanning a bandwidth greater than 0.1 nm.

19. The system of claim 1, wherein the object is a component of a microlithography exposure system.

20. A method for monitoring changes in position of an object, the method comprising:
  simultaneously i) directing input light to a first plurality of monitor cavities to sample a measurement range of an interferometric sensor at a first plurality of known optical path difference (OPD) values, the first plurality of monitor cavities each detecting an intensity value, and ii) directing input light to the interferometric sensor that interrogates the object,
  determining relevant aspects of a spectral distribution of the input light detected by the first plurality of monitor cavities,
  deriving an uncorrected distance measurement result from the interferometric sensor to determine relevant aspects of the spectral distribution detected by the interferometric sensor,
  decomposing the spectral distribution detected by the interferometric sensor into a second plurality of coefficients,
  determining a compensation based on measurements made by the first plurality of monitor cavities,
  applying the compensation to yield a corrected distance measurement of the object, wherein the first plurality of monitor cavities each produces different interference phase values due to different OPD values.

21. The method of claim 20, further comprising measuring, simultaneously with i) and ii), an overall intensity fluctuation of the input light using an additional intensity monitor.

22. The method of claim 20, wherein the intensity values detected by the first plurality of monitor cavities are processed to yield measured distances before the compensation is applied to yield the corrected distance measurement.

* * * * *